US006626557B1

(12) United States Patent
Taylor

(10) Patent No.: US 6,626,557 B1
(45) Date of Patent: Sep. 30, 2003

(54) MULTI-COLORED INDUSTRIAL SIGNAL DEVICE

(75) Inventor: Kenneth R. Taylor, Ivoryton, CT (US)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/474,264

(22) Filed: Dec. 29, 1999

(51) Int. Cl.[7] .................................................. B60Q 7/00

(52) U.S. Cl. ....................... 362/249; 362/235; 362/800; 362/251; 362/231

(58) Field of Search ................................ 362/240, 231, 362/363, 800, 246, 252, 251, 244, 230, 235, 249; 340/815.45

(56) References Cited

U.S. PATENT DOCUMENTS

| | | | | | |
|---|---|---|---|---|---|
| 2,734,189 | A | | 2/1956 | Trozmuller | 340/380 |
| 3,080,555 | A | | 3/1963 | Vadus et al. | 343/5 |
| 3,197,757 | A | | 7/1965 | Porta | 340/321 |
| 3,623,042 | A | | 11/1971 | Woehler et al. | 340/174.1 |
| 3,789,211 | A | | 1/1974 | Kramer | 240/10 |
| 3,790,937 | A | | 2/1974 | Munroe | 340/378 |
| 3,840,873 | A | | 10/1974 | Usui | 340/378 |
| 3,893,092 | A | | 7/1975 | Kessler | 340/213.1 |
| 3,983,532 | A | | 9/1976 | Hayes | 340/41 |
| 4,271,408 | A | | 6/1981 | Teshima et al. | 340/702 |
| 4,463,399 | A | | 7/1984 | Matherly et al. | 361/1 |
| 4,654,629 | A | | 3/1987 | Bezos et al. | 340/87 |
| 4,742,432 | A | | 5/1988 | Thillays et al. | 361/400 |
| 4,857,920 | A | | 8/1989 | Kataoka et al. | 340/907 |
| 4,935,665 | A | | 6/1990 | Murata | 313/500 |
| 4,965,561 | A | | 10/1990 | Havel | 340/762 |
| 5,053,765 | A | | 10/1991 | Sonehara et al. | 340/815.31 |
| 5,063,379 | A | | 11/1991 | Fabry et al. | 340/784 |
| 5,103,215 | A | | 4/1992 | Taylor et al. | 340/691 |
| 5,184,114 | A | | 2/1993 | Brown | 340/701 |
| 5,224,773 | A | | 7/1993 | Arimura | |
| 5,302,965 | A | | 4/1994 | Belcher et al. | 345/31 |
| 5,374,876 | A | | 12/1994 | Horibata et al. | 315/313 |
| 5,436,535 | A | | 7/1995 | Yang | 315/313 |
| 5,450,301 | A | | 9/1995 | Waltz et al. | 362/231 |
| 5,489,771 | A | | 2/1996 | Beach et al. | 250/205 |
| 5,585,785 | A | | 12/1996 | Gwin et al. | 340/575 |
| 5,594,433 | A | | 1/1997 | Terlep | 340/908.1 |
| 5,619,182 | A | | 4/1997 | Robb | 340/479 |
| 5,630,662 | A | * | 5/1997 | Ooms | 362/363 |
| 5,642,933 | A | | 7/1997 | Hitora | 362/243 |
| 5,676,456 | A | | 10/1997 | Sharp | 362/318 |
| 5,697,584 | A | | 12/1997 | Chew | 246/473.3 |
| 5,697,695 | A | * | 12/1997 | Lin et al. | 362/184 |
| 5,752,766 | A | | 5/1998 | Bailey et al. | 362/250 |
| 5,765,940 | A | | 6/1998 | Levy et al. | 362/240 |
| 5,769,532 | A | | 6/1998 | Sasaki | 362/237 |
| 5,806,965 | A | * | 9/1998 | Deese | 362/249 |
| 5,890,794 | A | * | 4/1999 | Abtahi et al. | 362/294 |
| 5,898,381 | A | | 4/1999 | Gartner et al. | 340/815.65 |
| 5,905,441 | A | | 5/1999 | Klee et al. | 340/815.4 |
| 5,929,568 | A | | 7/1999 | Eggers | 315/56 |
| 5,929,788 | A | * | 7/1999 | Vukosic | 362/800 |
| 6,054,932 | A | * | 4/2000 | Gartner et al. | 340/815.65 |
| 6,086,220 | A | * | 7/2000 | Lash et al. | 362/244 |
| 6,132,072 | A | * | 10/2000 | Turnbull et al. | 362/494 |
| 6,153,980 | A | * | 11/2000 | Marshall et al. | 362/800 |
| 6,483,439 | B1 | * | 11/2002 | Vukosic | 340/815.45 |

OTHER PUBLICATIONS

U.S. patent application Ser. No. 09/417,729, Vakosick, filed Oct. 14,1999.

* cited by examiner

*Primary Examiner*—Sandra O'Shea
*Assistant Examiner*—Anabel Ton
(74) *Attorney, Agent, or Firm*—Baker & Hostetler LLP

(57) ABSTRACT

An industrial signaling device having a single module with the capability of emitting different colored lights to indicate the operating condition of a machine. The emitted light can be steady or flashing, and controlled by an external PLC or an onboard microprocessor. The PLC or microprocessor interprets incoming information and causes the color of the light or its flashing pattern to change accordingly. The light source maybe an LED, ionizable gas or flourescent.

20 Claims, 6 Drawing Sheets

LED WIRING

MULTI-COLORED INDUSTRIAL SIGNAL DEVICE

BACKGROUND OF THE INVENTION

1. Field of the Invention

The present invention relates generally to industrial signaling devices for indicating the operating status of machinery or processes and, more particularly, to such signaling devices that are elevated in order to enhance their visibility.

2. Description of Related Art

Elevated industrial signaling devices are well-known in factory-type environments where numerous industrial machines are present. Generally, such industrial signaling devices are mounted on a pole so they are high above each machine and clearly visible from a distance. Each device typically has a plurality of modules that emit differently colored light for visually signaling the operating status of each machine.

In a typical signaling device, each of the lights is responsive to an operating status of the machine to which the device is connected. For example, a typical device has lights of various colors such as, blue, red, amber and green. Each of the these differing colors is contained in a discrete module. The differing colors of the lights correspond to various operating stages of the machine. For example, a blue light may indicate the machine is running correctly, an amber light may indicate that the machine is in need of service and a red light may indicate that the machine has ceased operating. The colors of the lights are very important because even at a distance an illuminated light of one color is immediately distinguishable from the other lights of different colors.

U.S. Pat. No. 5,103,215 to James et. al discloses a signaling light made from a plurality of differently colored vertically stacked modules with incandescent lights. The cover lens of each module may be removed separately and the bulbs in each module may be replaced without having to disassemble the entire piece.

U.S. Pat. No. 5,769,532 to Sasaki discloses a LED signaling light made from a plurality of differently colored vertically stacked modules. Each module contains a portion bulged outwardly, which is coated with a reflective material. The LEDs are arranged in rows so that their emitted light is reflected off the reflecting surface and projected into the environment surrounding the module.

U.S. Pat. No. 5,929,788 to Vukosic discloses a LED signaling device where clusters of LEDs arranged in rings are mounted on a circuit board and emit light on to a conical reflective surface. The conical reflective surface is outwardly flaring. In order to change to color of the emitted light different colored covers must be manually changed.

Elevated signaling devices are particularly effective in environments where the level of background noise is very high and there is a danger that an audible alarm will not be heard. Furthermore, the elevated signaling devices can distinguish between various malfunctioning conditions by relating different conditions to different colors of lights or to different frequencies of flashing lights. In a crowded factory, a system of elevated signaling devices enables maintenance people to quickly locate and identify specific problems in a large number of operating machines. Such a system is extremely effective and efficient because it enables a single individual to monitor a large number of machines from a distance where the operating status of all the machines can be simultaneously observed.

While these elevated signaling devices have proven to be very effective, they also have various disadvantages. Typical devices are made with a plurality of modules, where each module illuminates a different colored light. A design of one color per single module has numerous disadvantages.

One such disadvantage is when the manufacturing operation takes place in a clean room, such as in the manufacture of semiconductor devices. In order to have better environmental control, it is desirable to reduce the volume of the clean room as much as possible. Industrial signaling devices that employ multiple modules are often too large to be used in clean rooms that have reduced height. Also, multiple module lights have numerous interfaces between the lens of the light and the housing of the electrical components. Each connection interface is a weak spot where water, liquid, dust, corrosive materials, etc. can enter the light and ruin electronic components. Moreover, the manufacture of such multiple module lights is wasteful, and sometimes assembly of the multiple modules is required by the end user. Multiple modules require greater storage space and can be more expensive to handle and ship. They are also more cumbersome to install or service and this can be difficult when the multiple modules are at the end of a pole ten feet or more above a factory floor. Usually, a maintenance person climbs a ladder in order to reach the signaling device.

SUMMARY OF THE INVENTION

Set forth is a brief summary of the invention in order to solve the foregoing problems and achieve the foregoing and other benefits and advantages in accordance with the purposes and the present invention as embodied and broadly described herein.

The present invention provides an industrial signaling device having a light source within a single module, whereby the light source and emits a light of two or more colors that can be separately activated. In an embodiment of the present invention the module has a microprocessor that interprets incoming information and separately activates each differently colored light source. In another embodiment, the emission of the light is controlled by an external programmable logic controller and the module optionally contains a microprocessor. Light sources contemplated for use in this invention include LEDs, ionizable gas or a flourescent light. The present invention may include a reflective material mounted to reflect light out of the module. In another embodiment lens cover of the module is made from a polycarbonate material.

DETAILED DESCRIPTION OF THE PREFERRED EMBODIMENTS

Figure 1:
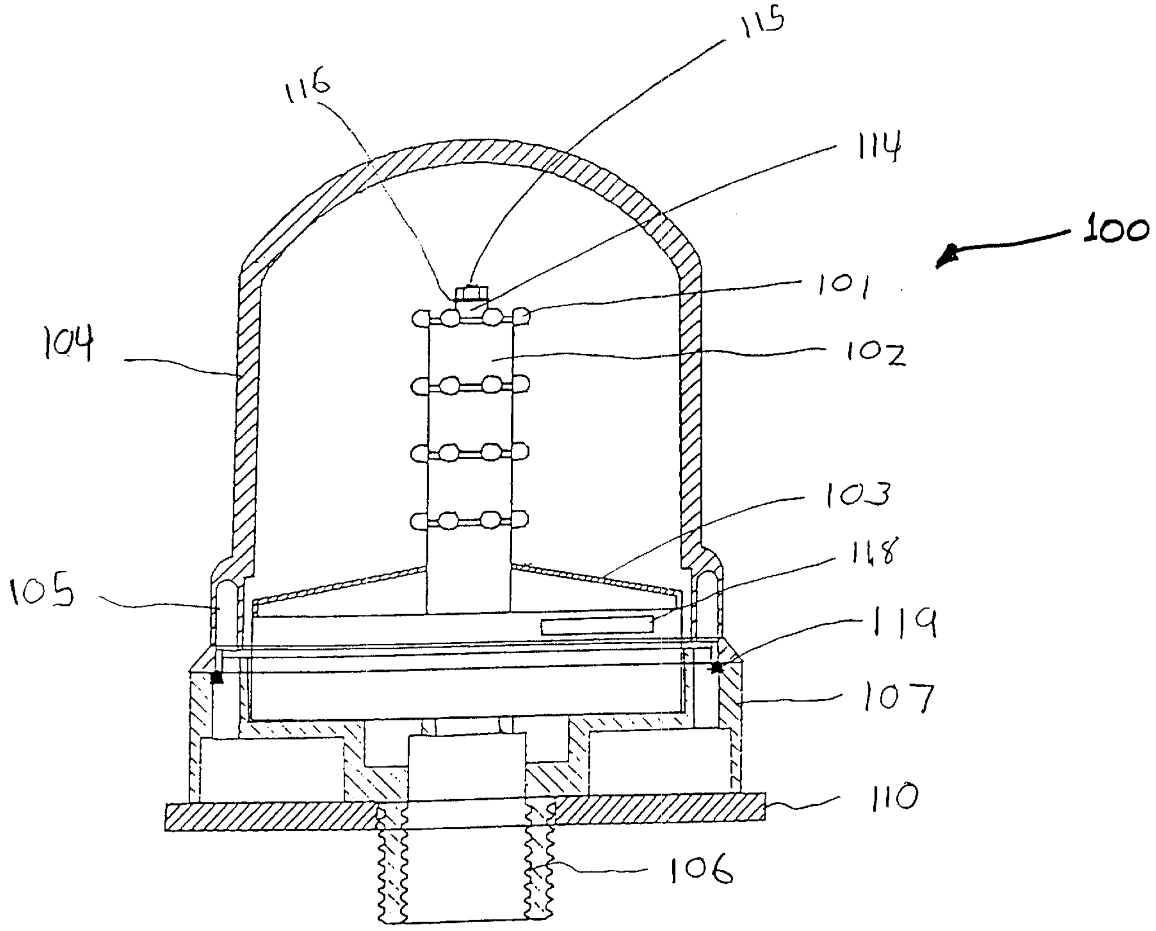
FIG. 1 is an vertical cross-section view according to one embodiment of the present invention.

Referring to the drawings, FIG. 1 illustrates the horizontal cross-section view of one embodiment of a single module of an industrial signaling device 100 of the present invention cover 104 surrounds and encloses rings of LEDs 101 mounted on a cylindrical wafer with a hollow center 102; which may be made of plastic. The lower three rings of LEDs are sandwiched between the cylindrical wafer, which are hollow in the center so they may be mounted on a post 114. A nut 115 and washer 116 secure the LEDs and cylindrical wafers into place.

The cover may be made of any substance that allows that transmission of light and is suitably tough enough for an industrial manufacturing environment, such as a plastic, for example, polycarbonate. To facilitate the diffusion of light, the plastic may be admixed with a fibrous substance or sand blasted to give a foggy appearance. Also, the cover may be clear or striated by grooves on any surface. The cover may be domed shaped or may have a flat top. The base 107 may be attached to the cover by an attachment means, such as screws, (not shown) that connect to the attachment-means holes 105 located at the bottom of the cover 104. The base may have a threaded stem 106 for installation on a stalk or directly on to a machine. An optional gasket 110 may be secured with a locking nut 112. Optionally, below the gasket, a metal plate (not shown) may be mounted.

An o-ring 119 may be mounted between the interface of the cover and the base to keep out dust, moisture, and other harmful agents present in the external environment. An advantage of the present invention is that only one interface is present between the cover and the base. By having a single module there is a single interface between the cover and the base. An interference of a module is a weak point that is more susceptible to penetration from harmful outside agents such as moisture, dust, corrosive chemicals, etc. The more interfaces that exist on a device, the more likely the device will fail because of attack from harmful outside agents.

The bottom reflector 103 may be conically shaped as shown or could be another shape, such as flat. The base may be coated with a reflective material to enhance the diffusion of the LEDs. The base may be conically or cone shaped to increase the amount of light transmitting outside of the cover 104. The base has an opening not shown from which the post 102 is inserted through. Wiring (not shown) connects the LEDs to an electrical power source and to a PLC (not shown) or an on board processor 118. Clusters of LEDs 101 are placed on the pole and separated by a distance sufficient to optimize placement of the LEDs with the focal point of the cover. The clusters of LEDs may be ring shaped. Each cluster of LEDs allows light to emit 360 degrees from a particular elevation. Such placement of the LEDs allows both vertical as well as horizontal (bi-planar) separation of the point LED light sources. This bi-planar separation allows greater diffusion of the light sources and a resulting enhanced fill of the lens enclosure. Diffusing the light enables increased viewing distance from the signal source. In this embodiment, four cluster of LEDs are shown but more or fewer rings may be used. Also for this embodiment, each cluster of LEDs has seven individual LEDs, although clusters having more or less LEDs are also envisioned. The number of LEDs in each cluster may be increased or decreased as desired. The clusters are preferably LEDs of different colors. In one embodiment each cluster has three red, two blue or green, and two amber LEDs.

The wafers are generally of the same shape as of the post. These wafers separate the LED rings and provide structural stability. The entire assembly is held together by a non-conductive plastic or nylon nut 115 that threads onto a threaded plastic bolt that runs up through the hollow central post assembly. Similar color LEDs on each cluster are electrically connected in series. Electrical connections are made within the hollow interior of the LED/wafer stacks and run down the stack to a printed circuit board (not shown) in the base of the signal fight.

The printed circuit board is electrically connected with an external PLC (not shown) or an internal microprocessor. PLCs are commonly used in industrial control environments in applications where automation of processes and indication of said processes is desirable. PLCs are readily available through electrical distributors from a variety of manufacturers including GE Fanuc, Siemens, and Allen Bradley. Microprocessors of the type used within signal devices have many applications within the computer and toy industries as well as the industrial control environment. Micro-processors are readily available from electrical component distribution sources as well as from manufacturers such as MicroChip and Motorola.

Figure 2:
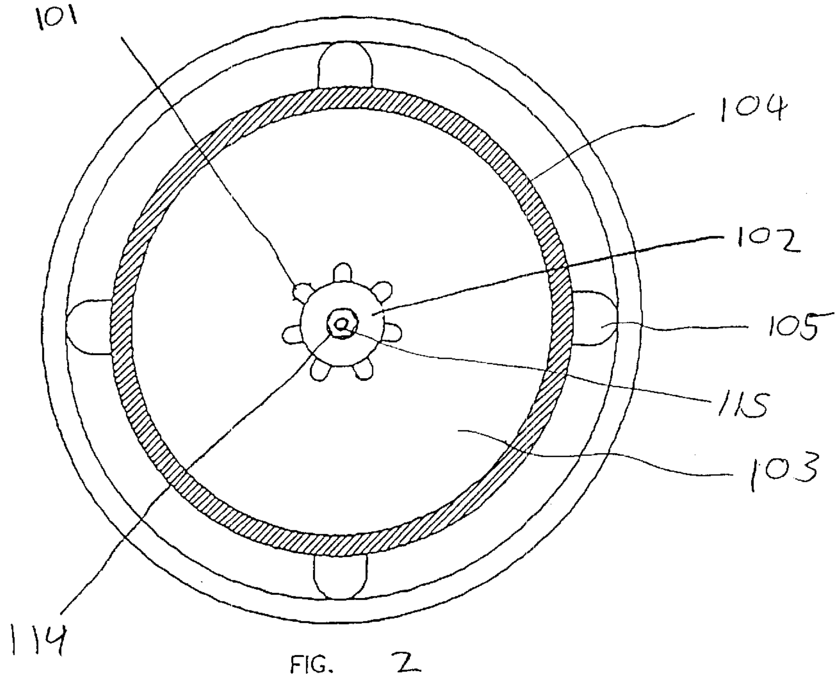
FIG. 2 is a horizontal cross-section view.
Figure 4:
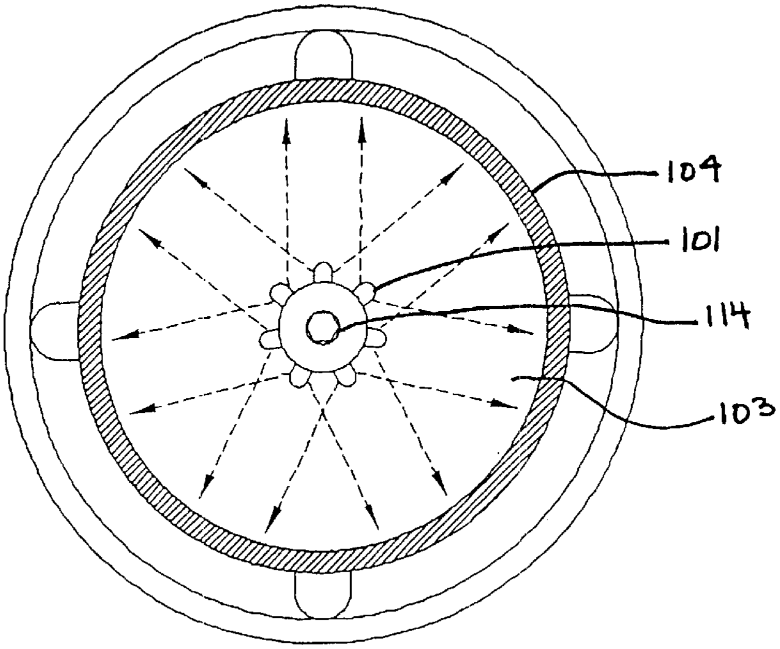
FIG. 4 is an explanatory diagram of a horizontal cross-section view illustrates light projection.
Figure 3:
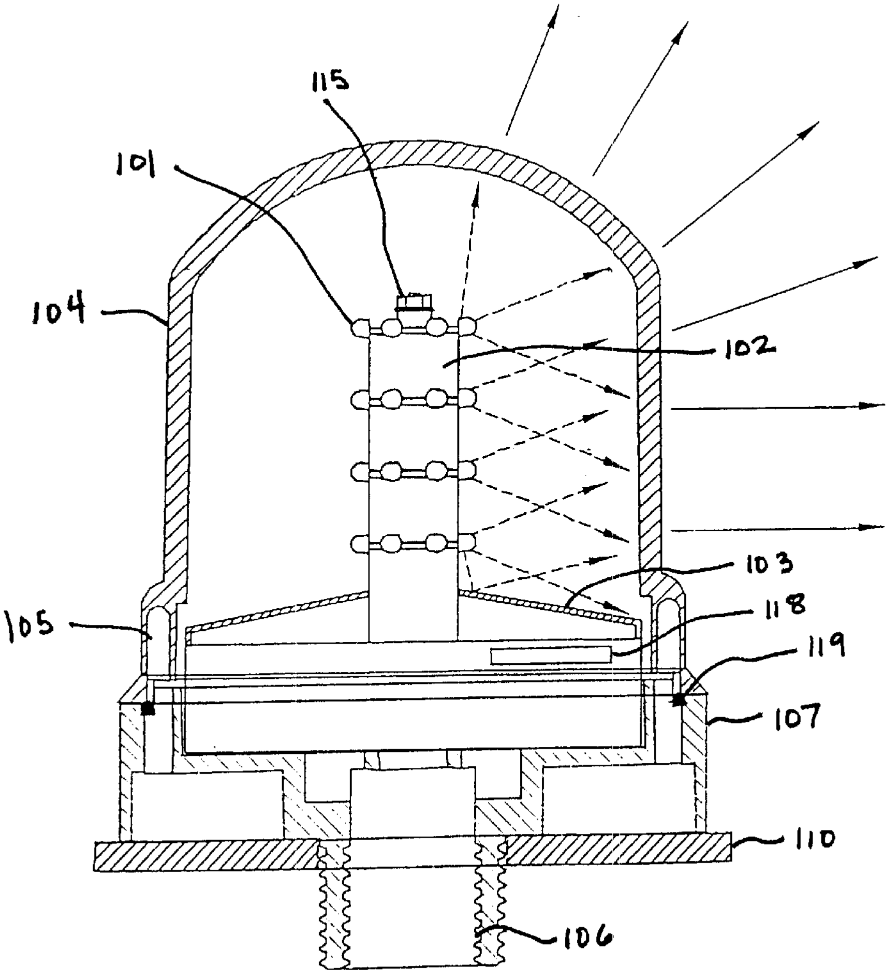
FIG. 3 is an explanatory diagram of a vertical cross-section that illustrates light projection.
Figure 5:
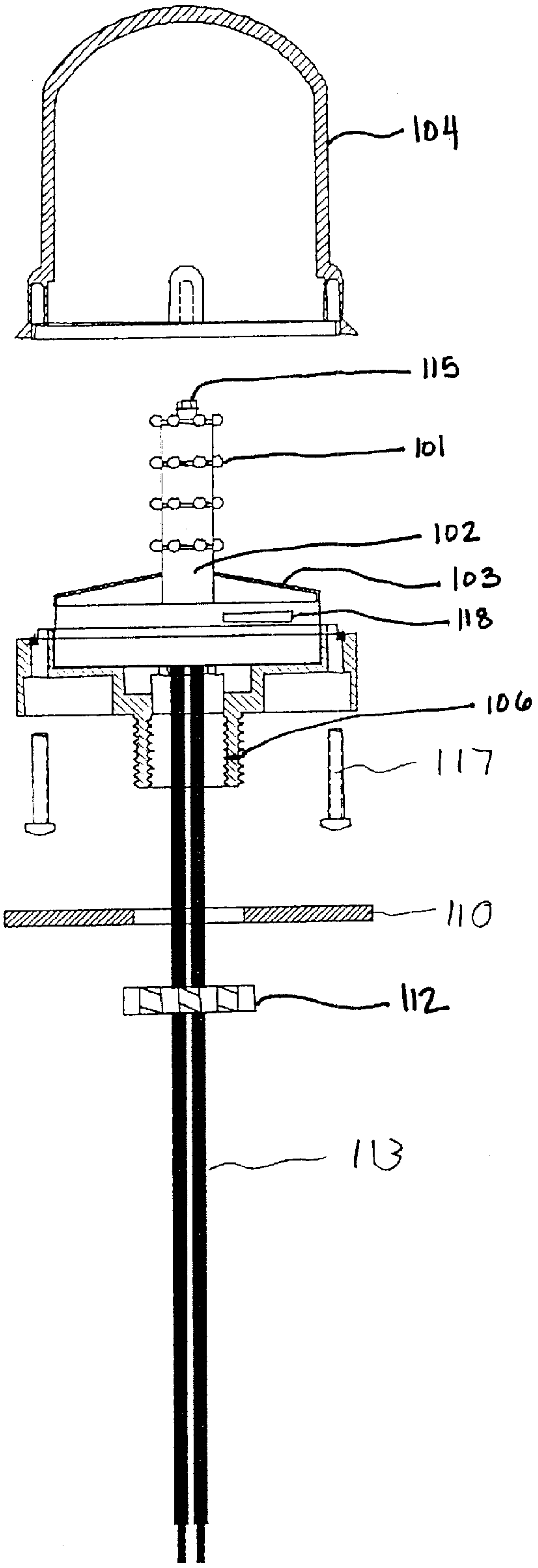
FIG. 5 is an exploded vertical cross-section view.
Figure 6:
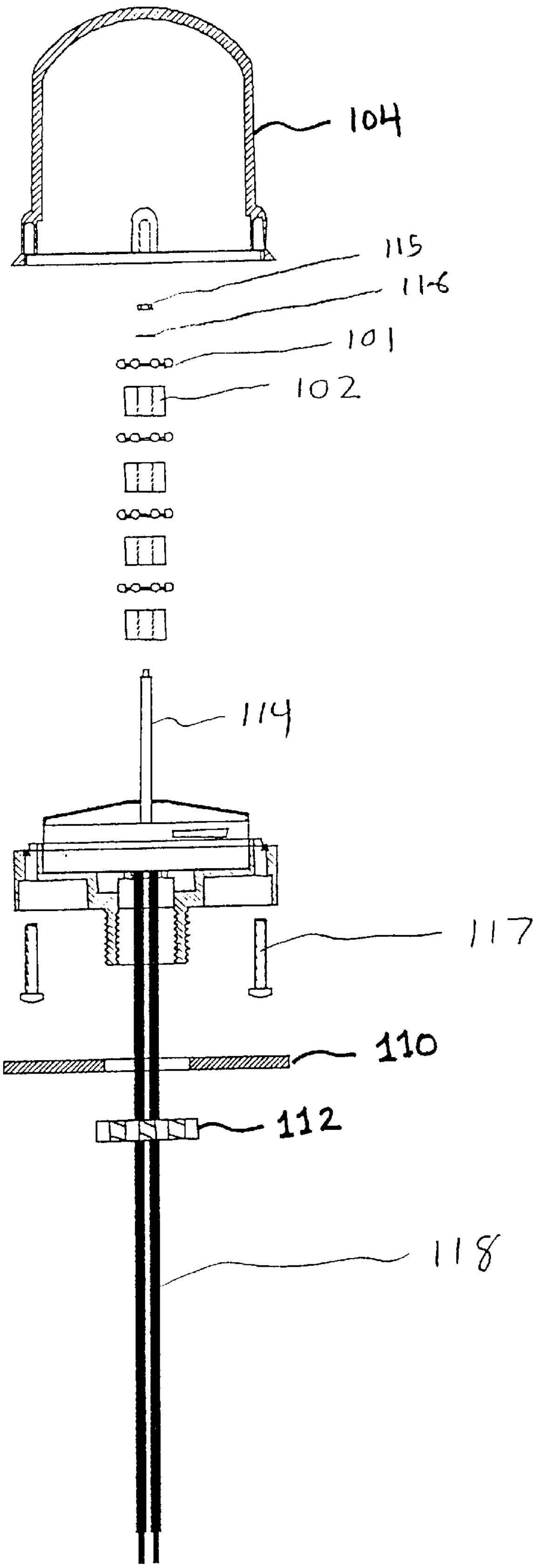
FIG. 6 is an exploded vertical cross-section view including a vertical cross-section view of a post with LEDs.
Figure 7:
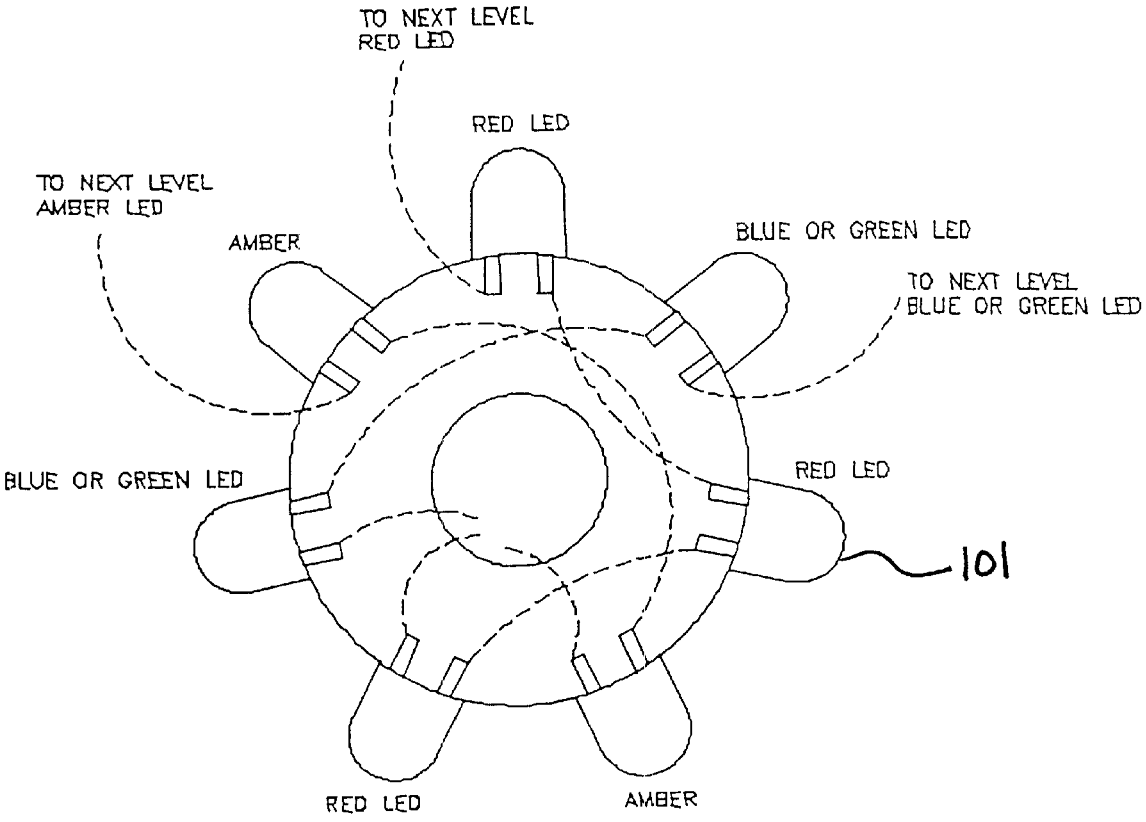
FIG. 7 is a horizontal cross-section view of an LED cluster.
Figure 8:
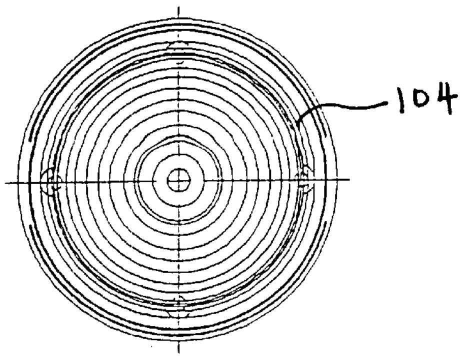
FIG. 8 is a vertical view of a striated lens cover.
Figure 9:
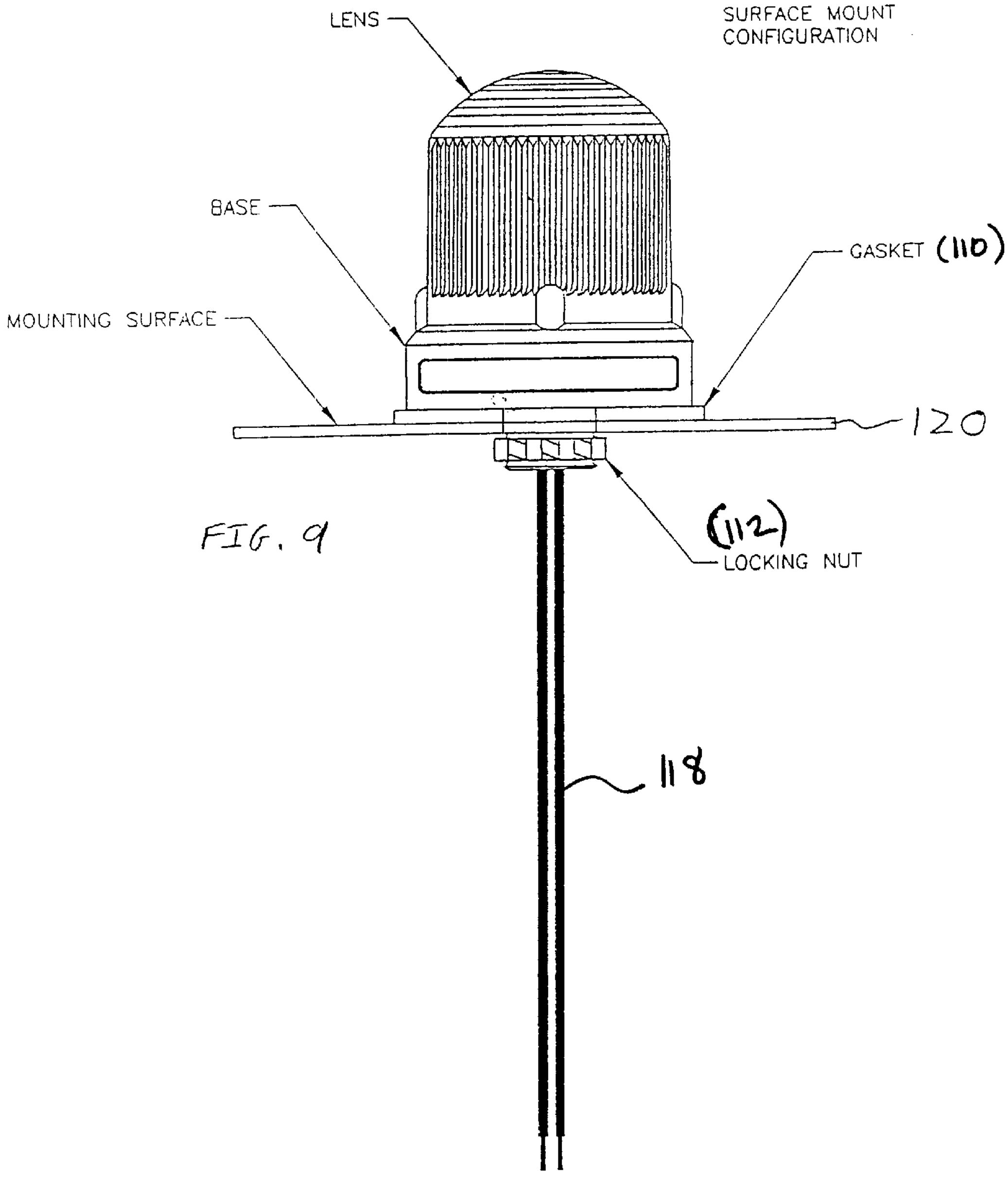
FIG. 9 is a vertical view of an embodiment of the present invention mounted upon a surface.

FIG. 2 shows a horizontal cross section view of an embodiment of the present invention. The top of the lens cover 104 is cut away to show the central post 114, LEDs 101, the mounting nut 115, and the bottom reflector 103. FIGS. 3 and 4 are illustrative examples of the 360 degree light projections of the LEDs. FIG. 5 is an exploded view. Wiring 113 and mounting screws 117, and the gasket 110 are shown. FIG. 6 is an exploded view also including an exploded of the wafers 102 and the LEDs 101 and post 114. FIG. 7 illustrates wiring of the LEDs. FIG. 8 is a vertical view of a striated lens cover. FIG. 9 shows an embodiment of the present invention mounted on a surface 120.

Other modifications in the design and applications of the invention to products similar to the ones described herein are possible without departing from the scope of the subject matter of the present invention. For instance, the light source could be flourescent or one that uses an ionizable gas, such as neon. Also, the top inside portion of the cover may be coated with a reflective material, instead of or in addition to have having a bottom reflector 103.

What is claimed is:

1. An industrial signaling device comprising:

a single lens module;

at least a light source contained within said module, wherein said light source includes a plurality of clusters said clusters which are disposed spaced apart from one another in horizontal differentiated layers, each of said clusters containing lights of different colors which can be independently activated such that a signal is seen to be emitting from a signal housing an individual color upon that color's cluster; and wherein said light source emits a light of at least two lights of different colors and said light source is located at a focal point of said single lens module of said signal housing so as to optimize a beam width signal projection with fewer lights than a densely packed arrangement.

2. An industrial signaling device according to claim 1, wherein said light source can alternately illuminate as either a steady or flashing light.

3. An industrial signaling device according to claim 1, further comprising a microprocessor, whereby said microprocessor interprets incoming information and separately activates each differently colored light source.

4. An industrial signaling device according to claim 1, further comprising a programmable logic controller.

5. An industrial signaling device according to claim 1, comprising at least three differently colored light sources.

6. The industrial signaling device of claim 1, wherein said single module comprises a polycarbonate material.

7. The industrial signaling device of claim 1, wherein said single module comprises a lens that has been sand blasted to give a foggy appearance.

8. The industrial signaling device of claim 1, wherein said single module comprises a lens comprising a plastic and a fiber.

9. The industrial signaling device of claim 1, wherein said light source is a plurality of LEDs, an ionizable gas or a flourescent light.

10. The industrial signaling device of claim 1, where said light source is a plurality of LEDs mounted on a post.

11. The industrial signaling device of claim 1, wherein said single module comprises a lens with a reflective material on the top inside portion of said lens.

12. The industrial signaling device of claim 1, wherein said single module comprises a reflective material mounted below said light source.

13. The industrial signaling device of claim 1, further comprising a cover and a base, wherein there is a single interface between said cover and said base.

14. An industrial signaling device comprising:

a single module means for protecting a light source, whereby said light source includes a plurality of clusters of lights, said clusters which are disposed spaced apart from one another in horizontal differentiated layers, each of said clusters containing lights of different colors which can be independently activated such that a signal is seen to be emitting from a signal housing an individual color upon that color's cluster, and a plurality of light sources disposed in a spaced apart arrangement and located at a focal point of said single module means of said signal housing so as to optimize a beam width signal projection with fewer light sources than a densely packed arrangement.

15. The industrial signaling device according to claim 14, wherein said light sources can alternately illuminate as either a steady or flashing light source.

16. The industrial signaling device according to claim 14, further comprising a processor means, whereby said processor means interprets incoming information and separately activates each different colored light source.

17. The industrial signaling device according to claim 14, further comprising a programmable logic controller means.

18. The industrial signaling device according to claim 14, wherein said light source emits lights of three different colors.

19. The industrial signaling device of claim 14, further comprising a reflective means mounted beneath said light source.

20. The industrial signaling device of claim 14, further comprising a reflective means mounted above said light source.

* * * * *